(12) United States Patent
Sakata et al.

(10) Patent No.: US 9,721,306 B2
(45) Date of Patent: Aug. 1, 2017

(54) DATA LINKAGE SUPPORT SYSTEM AND DATA LINKAGE SUPPORT METHOD

(71) Applicant: Hitachi, Ltd., Tokyo (JP)

(72) Inventors: Masahiko Sakata, Tokyo (JP); Junichi Morita, Tokyo (JP); Atsushi Aono, Tokyo (JP); Hiroki Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 20 days.

(21) Appl. No.: 14/737,015

(22) Filed: Jun. 11, 2015

(65) Prior Publication Data

US 2016/0140667 A1 May 19, 2016

(30) Foreign Application Priority Data

Nov. 17, 2014 (JP) .................................. 2014-232551

(51) Int. Cl.
*G06Q 40/00* (2012.01)
*G06F 17/30* (2006.01)

(52) U.S. Cl.
CPC ....... *G06Q 40/12* (2013.12); *G06F 17/30339* (2013.01); *G06F 17/30569* (2013.01); *G06F 17/30581* (2013.01)

(58) Field of Classification Search
CPC ............................... G06Q 40/00; G06Q 30/00
USPC ................. 705/30, 34; 379/114.28; 715/765
See application file for complete search history.

(56) References Cited

U.S. PATENT DOCUMENTS

| | | | | |
|---|---|---|---|---|
| 5,579,242 A | * | 11/1996 | Fisher | G07C 5/0883 702/165 |
| 5,838,634 A | * | 11/1998 | Jones | G01V 1/282 367/73 |
| 7,124,180 B1 | * | 10/2006 | Ranous | H04L 12/4633 707/999.004 |
| 8,521,624 B2 | * | 8/2013 | Ahmed | G06Q 30/04 370/351 |
| 2001/0020237 A1 | * | 9/2001 | Yarnall | G06F 17/30569 |
| 2005/0021427 A1 | * | 1/2005 | Takahashi | G06Q 40/00 705/30 |
| 2005/0256789 A1 | * | 11/2005 | Matsuoka | G06Q 40/12 705/30 |
| 2011/0178904 A1 | * | 7/2011 | Ahmed | G06Q 30/04 705/34 |
| 2012/0030075 A1 | * | 2/2012 | Ahmed | G06Q 30/04 705/30 |

(Continued)

FOREIGN PATENT DOCUMENTS

JP 2011-081702 A 4/2011

*Primary Examiner* — Seye Iwarere
(74) *Attorney, Agent, or Firm* — Volpe and Koenig, P.C.

(57) ABSTRACT

A data linkage support system is disclosed that includes a storage device storing a process object table and a specification table, and an arithmetic device that displays a screen including display of a data item prescribed by specification information of the specification table and an item selection interface accepting selection of a corresponding data item in the process object table to be correlated with the data item and that correlates the corresponding data item selected in the item selection interface with the data item prescribed by the specification information to generate and store a conversion parameter of accounting data between the consolidated subsidiary company and the parent company into the storage device.

8 Claims, 14 Drawing Sheets

(56) References Cited

U.S. PATENT DOCUMENTS

| | | | |
|---|---|---|---|
| 2013/0041794 A1* | 2/2013 | Kashima | G06Q 40/00 705/30 |
| 2014/0108211 A1* | 4/2014 | Bogdanov | G06Q 40/02 705/30 |
| 2014/0198969 A1* | 7/2014 | McRae | G06Q 40/10 382/138 |

* cited by examiner

DATA CONVERSION ACQUISITION SOURCE ITEM PARAMETER 120

| OUTPUT DESTINATION ITEM NUMBER | ACQUISITION SOURCE TABLE NAME | ACQUISITION SOURCE ITEM NAME | FIXED VALUE |
|---|---|---|---|
| ... | | | |
| 49 | CUSTOMER TABLE | CUSTOMER GROUP | |
| 50 | | | CHEM |
| 51 | CUSTOMER TABLE | CREDIT CONTROL CLASSIFICATION | |
| ... | | | |

OUTPUT DESTINATION ITEM NUMBER TABLE — 121

| OUTPUT DESTINATION ITEM NUMBER 1210 | OUTPUT DESTINATION ITEM NAME 1211 | VARIABLE TYPE 1212 | VARIABLE LENGTH 1213 | DECIMAL POINT 1214 |
|---|---|---|---|---|
| ... | | | | |
| 49 | SEGMENT ID | CHARACTER STRING | 4 | |
| 50 | FREE ANALYSIS ITEM 1 | CHARACTER STRING | 10 | |
| 51 | FREE ANALYSIS ITEM 2 | CHARACTER STRING | 10 | |
| ... | | | | |

FIG. 3

ACQUISITION SOURCE TABLE LIST TABLE 122

1221

| ACQUISITION SOURCE TABLE NAME 1220 | DISPLAY NAME |
|---|---|
| CUSTOMER TABLE | CUSTOMER |
| ACCOUNTS RECEIVABLE LEDGER TABLE | ACCOUNTS RECEIVABLE LEDGER |
| SUPPLIER TABLE | SUPPLIER |
| ACCOUNTS PAYABLE LEDGER TABLE | ACCOUNTS PAYABLE LEDGER |
| FINANCIAL CLASSIFICATION TABLE | FINANCIAL CLASSIFICATION |

TABLE ITEM LIST TABLE — 123

| ACQUISITION SOURCE ITEM NAME | DISPLAY NAME |
|---|---|
| 1230 | 1231 |
| (SINCE THIS IS TEMPORARILY USED TABLE, NO DATA IS RETAINED EXCEPT WHEN PROGRAM ACQUIRES DATA) | |

CUSTOMER TABLE ~125

| ITEM NAME | CUSTOMER CODE 12500 | CUSTOMER NAME 12501 | CUSTOMER GROUP 12502 | PAYMENT TERMS 12503 | PAYMENT METHOD 12504 | INCOTERMS 12505 | STANDARD CURRENCY 12506 | LANGUAGE 12507 | CREDIT CONTROL CLASSIFICATION 12508 | CREDIT AMOUNT 12509 |
|---|---|---|---|---|---|---|---|---|---|---|
| DISPLAY NAME | CUSTOMER CODE | CUSTOMER GROUP NAME | GROUP NAME | PAYMENT TERMS | PAYMENT METHOD | INCOTERMS | CURRENCY | DOCUMENT LANGUAGE | CREDIT CONTROL GROUP | CREDIT AMOUNT |
| VALUE | A001 | CUSTOMER A1 | A | N30 | BANK TRANSFER | FOB | USD | ENGLISH | A | 1000000 |
| | A002 | CUSTOMER A2 | A | N30 | BANK TRANSFER | FOB | USD | ENGLISH | A | 1000000 |
| | A003 | CUSTOMER A3 | B | N30 | CHECK | DDP | USD | ENGLISH | B | 7000000 |
| | ... | | | | | | | | | |

FIG. 6

CUSTOMER TABLE ~125

| | 12510 | 12511 | 12512 | 12513 | 12514 | 12515 | 12516 | 12517 | 12518 | 12519 | 12520 | 12521 | 12522 | 12523 |
|---|---|---|---|---|---|---|---|---|---|---|---|---|---|---|
| ITEM NAME | CUSTOMER CODE | CUSTOMER NAME | CUSTOMER GROUP | PAYMENT TERMS | PAYMENT METHOD | INCOTERMS | STANDARD CURRENCY | LANGUAGE | CREDIT CONTROL CLASSIFICATION | CREDIT AMOUNT | GERMANY-SPECIFIC TAX CATEGORY ID | COMPANY-SPECIFIC ADDITIONAL ITEM 1 | COMPANY-SPECIFIC ADDITIONAL ITEM 2 | COMPANY-SPECIFIC ADDITIONAL ITEM 3 |
| DISPLAY NAME | CUSTOMER CODE | CUSTOMER NAME | GROUP NAME | PAYMENT TERMS | PAYMENT METHOD | INCOTERMS | CURRENCY | DOCUMENT LANGUAGE | CREDIT CONTROL GROUP | CREDIT AMOUNT | VAT ID | Reference #1 | Reference #2 | Reference #3 |
| VALUE | B001 | CUSTOMER B1 | A | N60 | BANK TRANSFER | FOB | EUR | GERMAN | A | 1000000 | DE100001 | Sales person name 1 | Procurement person name 1 | Accounting person name 1 |
| | B002 | CUSTOMER B2 | A | N30 | BANK TRANSFER | FOB | EUR | GERMAN | A | 1000000 | DE100002 | Sales person name 2 | Procurement person name 2 | Accounting person name 2 |
| | B003 | CUSTOMER B3 | B | N90 | BANK TRANSFER | DDP | EUR | GERMAN | B | 7000000 | DE100003 | Sales person name 3 | Procurement person name 3 | Accounting person name 3 |
| ⋮ | | | | | | | | | | | | | | |

| OUTPUT DESTINATION ITEM NUMBER | ACQUISITION SOURCE TABLE NAME | ACQUISITION SOURCE ITEM NAME | FIXED VALUE |
|---|---|---|---|
| ... | | | |
| 49 | | | CHEM |
| 50 | CUSTOMER TABLE | | |
| 51 | <u>CUSTOMER TABLE</u> | CUSTOMER GROUP ▼ | |
| ... | | | |

| OUTPUT DESTINATION ITEM NUMBER | ACQUISITION SOURCE TABLE NAME | ACQUISITION SOURCE ITEM NAME | FIXED VALUE |
|---|---|---|---|
| ... | | | |
| 49 | CUSTOMER TABLE | CUSTOMER GROUP | CHEM |
| 50 | CUSTOMER TABLE | CREDIT CONTROL CLASSIFICATION | |
| 51 | | | |
| ... | | | |

DATA LINKAGE SUPPORT SYSTEM AND DATA LINKAGE SUPPORT METHOD

CROSS-REFERENCE TO RELATED APPLICATION

The present application claims the benefit of priority pursuant to 35 U.S.C. §119(a) to Japanese Patent Application No. 2014-232551, filed on Nov. 17, 2014, the entire disclosure of which is hereby incorporated herein by reference.

BACKGROUND OF THE INVENTION

1. Field of the Invention

The present invention relates to a data linkage support system and a data linkage support method, and more particularly, to a technique enabling linkage of accounting data variously different in specification between companies to be consolidated under favorable cost performance and efficiency.

2. Description of the Related Art

Between a subsidiary company and a parent company subjected to consolidated accounting, an operational arrangement is established such that the parent company collects various data associated with a business activity in the subsidiary company and applies the data to an accounting process. Particularly, an enterprise group including a plurality of subsidiary companies has, for example, a server for order reception/placement and production management of products operated by the subsidiary companies and a financial accounting server for consolidating accounting data of the subsidiary companies operated by the parent company, and has an arrangement for giving and receiving the data between the both servers. The various data exchanged in this way include a wide variety of data such as credits, debts, sales, purchasing, money received, payment, and manufacturing cost in the subsidiary companies classified by items, may not be directly processable in the financial accounting server of the parent company in many cases, and generally go through a data conversion process between the servers.

With regard to such a technique, for example, for the purpose of easily converting data by changing simple query information even when specifications of transaction data of a conversion source or specifications of accounting data of a conversion destination are changed, a data conversion device (see Japanese Laid-Open Patent Publication No. 2011-081702) is proposed that stores data acquired from an interface table, which has data taken over from a transaction data table, into an accounting data table for common fields related to general items of accounting data and that acquires data identifying records of the transaction data table by reference to the interface table for non-common fields related to the other items, thereby storing data of fields identified by the query information from the identified records into the accounting data table.

On the other hand, if a plurality of subsidiary companies is located in respective countries different from that of a parent company, the definition and the numbers of items of data managed by the subsidiary companies are often different from each other depending on legal regulations of the countries. Since laws are revised at different paces and have various details in foreign countries, it is considered that the definition and the numbers of items of data described above may be changed at various frequencies in the subsidiary companies.

If the data conversion process described above is established in accordance with such a situation, a system executing the data conversion process must highly frequently be altered and updated for confirmation of definition of data managed by the subsidiary companies and reconfiguration of programs corresponding thereto, requiring considerable costs and efforts. On the other hand, even if the person in charge of each of the subsidiary companies makes such alterations to the system, this is impractical because of a high technical restriction.

SUMMARY OF THE INVENTION

It is therefore an object of the present invention to provide a technique enabling linkage of accounting data variously different in specification between companies to be consolidated under favorable cost performance and efficiency.

A data linkage support system of the present invention solving the problem comprises a storage device storing a process object table that stores accounting process object data managed in a consolidated subsidiary company and a specification table that stores specification information of data handled in an accounting system of a parent company; and an arithmetic device displaying on a display device or a predetermined terminal a screen including display of a data item prescribed by the specification information of the specification table and an item selection interface accepting selection of a corresponding data item in the process object table to be correlated with the data item, the arithmetic device correlating the corresponding data item selected in the item selection interface with the data item prescribed by the specification information to generate and store a conversion parameter of accounting data between the consolidated subsidiary company and the parent company into the storage device.

In a data linkage support method of the present invention, a computer system includes a storage device storing a process object table that stores accounting process object data managed in a consolidated subsidiary company and a specification table that stores specification information of data handled in an accounting system of a parent company, and the computer system displays on a display device or a predetermined terminal a screen including display of a data item prescribed by the specification information of the specification table and an item selection interface accepting selection of a corresponding data item in the process object table to be correlated with the data item, correlates the corresponding data item selected in the item selection interface with the data item prescribed by the specification information to generate and store a conversion parameter of accounting data between the consolidated subsidiary company and the parent company into the storage device.

The present invention enables linkage of accounting data variously different in specification between companies to be consolidated under favorable cost performance and efficiency.

BRIEF DESCRIPTION OF THE DRAWINGS

FIG. 2 is a diagram of a data configuration example of a data conversion acquisition source item parameter in this embodiment;

FIG. 3 is a diagram of a data configuration example of an output destination item number table of this embodiment;

FIG. 4 is a diagram of a data configuration example of an acquisition source table list table in this embodiment;

FIG. 5 is a diagram of a data configuration example of a table item list table in this embodiment;

FIG. 6 is a diagram of a first example of a customer table in this embodiment;

FIG. 7 is a diagram of a second example of the customer table in this embodiment;

FIG. 11 is a diagram of a second display screen example in this embodiment;

FIG. 14 is a diagram of a fifth display screen example in this embodiment.

DESCRIPTION OF THE PREFERRED EMBODIMENTS

System Configuration

Figure 1:
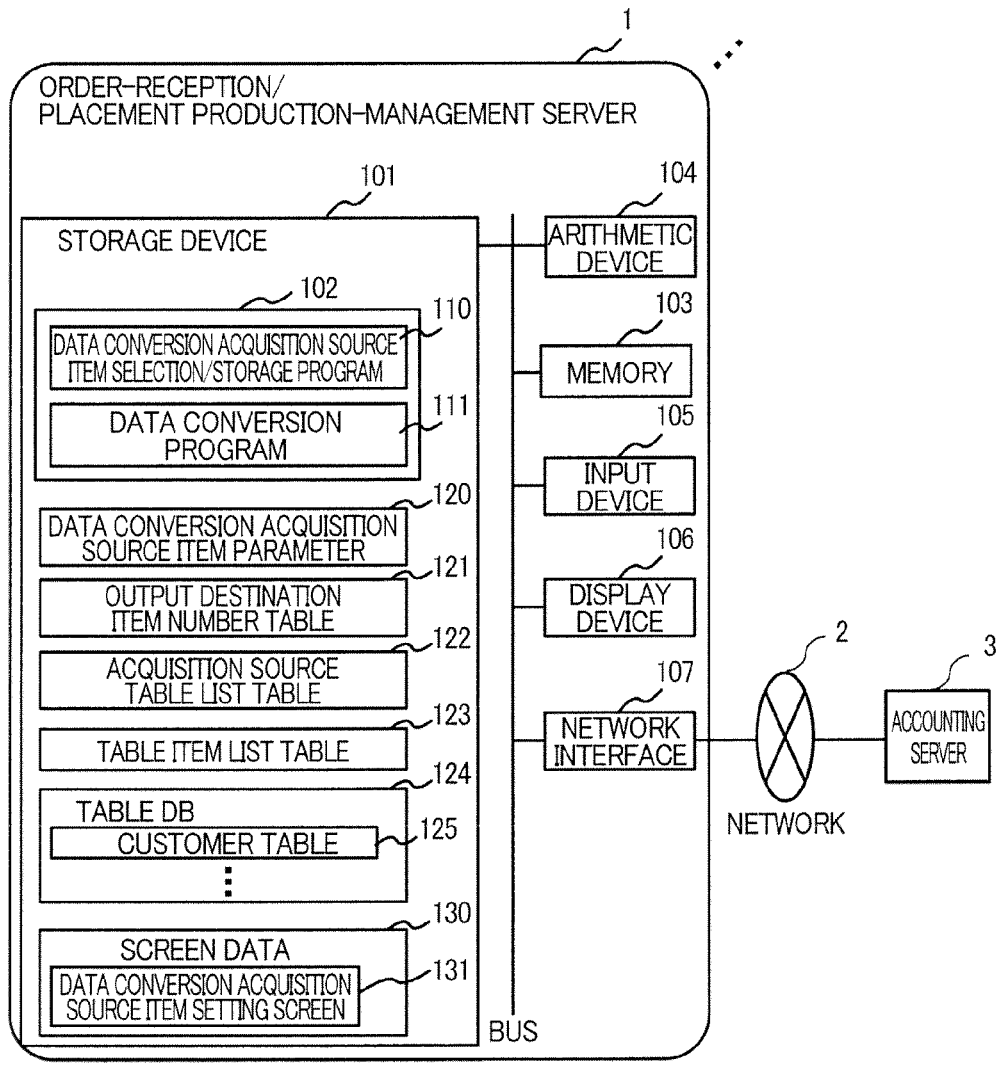
FIG. 1 is a diagram of a network configuration example including an order-reception/placement production-management server that is a data linkage support system in this embodiment.

An embodiment of the present invention will now be described in detail with reference to the drawings. FIG. 1 is a network configuration diagram including an order-reception/placement production-management server 1 that is a data linkage support system in this embodiment. The order-reception/placement production-management server 1 depicted in FIG. 1 is a computer system enabling linkage of accounting data variously different in specification between companies to be consolidated under favorable cost performance and efficiency.

The order-reception/placement production-management server 1 exemplarily depicted in FIG. 1 is a server device operated in each consolidated subsidiary company and is a device managing accounting data associated with a business activity in a corresponding company, for example, financial classification data related to the order reception/placement and production management of commercial products. On the other hand, an accounting server 3 operated by headquarters is coupled through a network 2 to this order-reception/placement production-management server 1. The accounting server 3 is a server device integrating the financial classification data transmitted from the order-reception/placement production-management server 1 of each of the subsidiary companies. This accounting server 3 itself is the same as an existing accounting server. On the other hand, the order-reception/placement production-management server 1 is a device making up the data linkage support system in this embodiment and provides the financial classification data after conversion of a format and contents into those corresponding to specifications of an accounting process in the accounting server 3.

The financial classification data managed by the order-reception/placement production-management server 1 is finely differentiated depending on a legal system of a country or a district where the consolidated subsidiary company is located and, when the conversion described above is properly performed based on such a situation, conventionally, a system engineer responsible for maintenance of the corresponding server must accordingly spend time and incur costs to modify a program for a conversion process of the financial classification data in the order-reception/placement production-management server 1. However, the order-reception/placement production-management server 1 acting as the data linkage support system of this embodiment enables the persons in charge etc., of the consolidated subsidiary companies to easily set parameters for the data conversion and apply appropriate data conversion appropriate for actual conditions of the corresponding country or district to the financial classification data while considerably reducing the efforts and costs.

A hardware configuration of the order-reception/placement production-management server 1 will be described. The order-reception/placement production-management server 1 in this embodiment includes a storage device 101 made up of an appropriate non-volatile memory element such as an SSD (solid state drive) or a hard disk drive, a memory 103 made up of a volatile storage element such as a RAM, an arithmetic device 104 such as a CPU that generally controls the entire device by reading programs 102 retained in the storage device 101 to the memory 103 for execution and that executes various determination, arithmetic, and control processes, an input device 105 accepting key input etc. from a user, a display device 106 such as a display displaying process data, and a network interface 107 coupling to the network 2 and responsible for a communication process with the accounting server 3.

It is noted that date 120 to 125 and 130 are at least stored in the storage device 101 in addition to the programs 102 (data conversion acquisition source item selection/storage program 110 and a data conversion program 111) for implementing functions necessary for the data linkage support system of this embodiment. Although a specific example will be described later, the date 120 to 125 and 130 include a data conversion acquisition source item parameter 120, an output destination item number table 121, an acquisition source table list table 122, a table item list table 123, a table database 124 (at least including a customer table 125 that is a process object table), and a screen data 130 (including a data conversion acquisition source item setting screen 131).

Functions included in the order-reception/placement production-management server 1 of this embodiment will be described. As described above, the functions described below are considered as functions implemented by executing the programs 102 included in the order-reception/placement production-management server 1, for example.

The order-reception/placement production-management server 1 of this embodiment has a function of displaying on the display device 106 (or a predetermined terminal) a screen including display of an output destination item number etc. (a data item) prescribed by the output destination item number table 121 (specification table) and an item selection interface accepting selection of a corresponding data item in a process object table (the customer table 125 in this embodiment; the same applies hereafter) to be correlated with the output destination item number, and correlating an acquisition source item name selected in the item selection interface by a person in charge etc. of a consolidated subsidiary company with the output destination item number etc. prescribed by the output destination item number table 121 to generate and store a conversion parameter of accounting data between the corresponding consolidated subsidiary company and the parent company into the storage device 101. This function is a function implemented by the arithmetic device 104 executing the data conversion acquisition source item selection/storage program 110 out of the programs 102 in the storage device 101.

The order-reception/placement production-management server 1 also has a function of transmitting data of a data item in the customer table 125 that is the process object table in correlation with a data item of the output destination item number table 121 prescribed by the conversion parameter with respect to the corresponding data item to the accounting server 3. This function is a function implemented by the arithmetic device 104 executing the data conversion program 111 out of the programs 102 in the storage device 101.

Out of the functions, the function from the data conversion acquisition source item selection/storage program 110 further includes a function of, when displaying the screen including the item selection interface, displaying on the display device 106 the screen further including a table selection interface accepting selection of a process object table to be correlated with an output destination item number etc. in the output destination item number table 121, generating a list of data items included in the corresponding customer table 125 for the customer table 125 that is the process object table of the selection by the person in charge etc. of the consolidated subsidiary company accepted through this screen, and displaying on the display device 106 the screen including the list as a selection list of the data items in the item selection interface.

The function from the data conversion acquisition source item selection/storage program 110 further includes a function of, when generating the conversion parameter, correlating a corresponding data item selected by the person in charge etc. of the consolidated subsidiary company in the list of the item selection interface with an output destination item number etc. prescribed by the output destination item number table 121 to generate and store a conversion parameter, i.e., the data conversion acquisition source item parameter 120, into the storage device 101.

Out of the functions described above, the data conversion program 111 further includes a function of converting data of a data item in the customer table 125 that is the process object table in accordance with a predetermined conversion algorithm corresponding to specification information prescribed by the conversion parameter with respect to the corresponding data item, and transmitting the converted data in correlation with a data item prescribed by the output destination item number table 121 to the accounting server 3.

Data Structure Example

A configuration example of data used by the order-reception/placement production-management server 1 of this embodiment will be described. FIG. 2 is a diagram of a data configuration example of the data conversion acquisition source item parameter 120 included in the order-reception/placement production-management server 1 of this embodiment. The data conversion acquisition source item parameter 120 is a conversion parameter of this embodiment prescribing the correlation between the specification of data handled by the accounting server 3 and the financial classification data handled by the order-reception/placement production-management server 1 and is an aggregate of records correlating values of an acquisition source table name 1201, an acquisition source item name 1202, and a fixed value 1203 by using an output destination item number 1200 as a key. Out of these values, the values other than the fixed value 1203 are selected and set by a person in charge etc. of a consolidated subsidiary company based on information provided by the order-reception/placement production-management server 1.

In the data conversion acquisition source item parameter 120, the output destination item number 1200 is set to a value common with an output destination item number 1210 in the output destination item number table 121 (FIG. 3). It is obvious that the person in charge etc. of the consolidated subsidiary company may refer to the output destination item number table 121 and selectively set the value in a corresponding field of the data conversion acquisition source item parameter 120.

The acquisition source table name 1201 is a value selectively set as the process object table to be correlated with respect to the output destination item number 1200, i.e., the data item handled by the accounting server 3, by the person in charge etc. of the consolidated subsidiary company by reference to the acquisition source table list table 122. Specific examples of a process and an interface associated with such selection will be described later.

The acquisition source item name 1202 is set to a name of a data item selected in the item selection interface by the person in charge etc. of the consolidated subsidiary company out of the data items included in the process object table set in the acquisition source table name 1201 (in this case, the data items are extracted from the process object table and stored into the table item list table 123 and can be browsed by the person in charge etc. of the consolidated subsidiary company). Specific examples of a process and an interface associated with such selection will be described later.

The fixed value 1203 is set to a fixed value that may be taken by the corresponding data item in the accounting server 3 independently of the acquisition source table name 1201 and the acquisition source item name 1202, and is a character string arbitrarily set by the person in charge etc. of the consolidated subsidiary company.

FIG. 3 is a diagram of a data configuration example of the output destination item number table 121 (specification table) included in the order-reception/placement production-management server 1 of this embodiment. The output destination item number table 121 is a table prescribing the specifications of the data items handled by the accounting server 3 and stores the information of the corresponding specifications when the data items are considered as data items of the "output destination" from the viewpoint of the order-reception/placement production-management server 1. Therefore, the output destination item number table 121 is an aggregate of records correlating values such as an output destination item name 1211, a variable type 1212, a variable length 1213, and a decimal point 1214 by using the output destination item number 1210 as a key.

The output destination item number 1210 is identification information of the data items in the accounting server 3 and is set to a value common with the output destination item number 1200 in the data conversion acquisition source item parameter 120 described above.

The output destination item name 1211 is a name of a data item indicated by the output destination item number 1210 and corresponds to a value such as a currency code, a voucher number, a customer, a supplier, a transaction amount, and a posting date, for example. The variable type 1212, the variable length 1213, and the decimal point 1214 define a value of a data item indicted by the output destination item name 1211 in terms of the type, the length, and the decimal point position thereof. The decimal point 1214 is set only when the variable type 1212 is set to include a decimal point.

FIG. 4 is a diagram of a data configuration example of the acquisition source table list table 122 included in the order-reception/placement production-management server 1 of this embodiment. The acquisition source table list table 122 is a table describing a list of the process object tables retained in the order-reception/placement production-management server 1 and is an aggregate of records correlating an acquisition source table name 1220 with a display name 1221.

The acquisition source table name 1220 is identification information of a process object table linkable to the accounting server 3 and is referenced and selected through the table selection interface by the person in charge etc. of the consolidated subsidiary company and is set to the acquisition source table name 1201 of the data conversion acquisition source item parameter 120. The display name 1221 is a general name of the table corresponding to the acquisition source table name 1220.

As exemplarily illustrated in the acquisition source table list table 122, the process object tables include not only the customer table 125 but also various tables such as an accounts receivable ledger table, a supplier table, an accounts payable ledger table, and a financial classification table.

FIG. 5 is a diagram of a data configuration example of the table item list table 123 included in the order-reception/placement production-management server 1 of this embodiment. The table item list table 123 is a table storing data corresponding to a list of the data items in the item selection interface described above and is an aggregate of records correlating a display name 1231 with an acquisition source item name 1230.

The acquisition source item name 1230 is each data item included in the process object table selected in the table selection interface by the person in charge etc. of the consolidated subsidiary company, for example. The display name 1231 is a name of the data item indicated by the acquisition source item name 1230 and takes a value such as a customer code, a supplier code, and payment terms, for example. The table item list table 123 has no data except when data is stored in association with execution of the data conversion acquisition source item selection/storage program 110.

FIG. 6 is a diagram of an example of the customer data 125 included in the order-reception/placement production-management server 1 of this embodiment. The customer data 125 is one of the process object tables and is a table managed in accordance with the business activity in the consolidated subsidiary company operating the order-reception/placement production-management server 1. The customer data 125 exemplarily illustrated in FIG. 6 is based on the assumption that the United States is the country where the consolidated subsidiary company managing the table is located, and is an aggregate of records correlating values of a customer code 12500, a customer name 12501, a customer group 12502, payment terms 12503, a payment method 12504, incoterms 12505, a standard currency 12506, a language 12507, a credit control classification 12508, and a credit amount 12509, as the item names of data. The item names are correlated with display names thereof and correspond to the respective display names of a "code" for the customer code 12500, a "customer" for the customer name 12501, a "group name" for the customer group 12502, "payment terms" for the payment terms 12503, a "payment method" for the payment method 12504, "incoterms" for the incoterms 12505, a "currency" for the standard currency 12506, a "document language" for the language 12507, a "credit control group" for the credit control classification 12508, and a "credit amount" for the credit amount 12509.

On the other hand, the customer table 125 exemplarily illustrated in FIG. 7 is the customer table similar to FIG. 6 and is based on the assumption that Germany is the country where the consolidated subsidiary company managing the table is located, including constituent elements different from the customer table of FIG. 6. In particular, the customer table 125 exemplarily illustrated in FIG. 7 includes a customer code 12510, a customer name 12511, a customer group 12512, payment terms 12513, a payment method 12514, incoterms 12515, a standard currency 12516, a language 12517, a credit control classification 12518, and a credit amount 12519, and additionally includes a Germany-specific tax category ID 12520, a company-specific additional item 1 (12521), a company-specific additional item 2 (12522), and a company-specific additional item 3 (12523). As compared to the customer table 125 of FIG. 6, the customer table 125 exemplarily illustrated in FIG. 7 includes the specific data items in the configuration in accordance with the German legal system. As described above, the configurations of the process object tables, i.e., the contents of the financial classification data provided from the order-reception/placement production-management server 1 to the accounting server 3 differ depending on the legal system of the country or district where the consolidated subsidiary company is located.

First Process Procedure Example

An actual procedure of the data linkage support method in this embodiment will hereinafter be described with reference to the figures. Various operations corresponding to the data linkage support method described below is implemented by the programs 102 read to the memory 103 and executed by the order-reception/placement production-management server 1. The programs 102 are made up of codes for performing the various operations described below.

Figure 8:
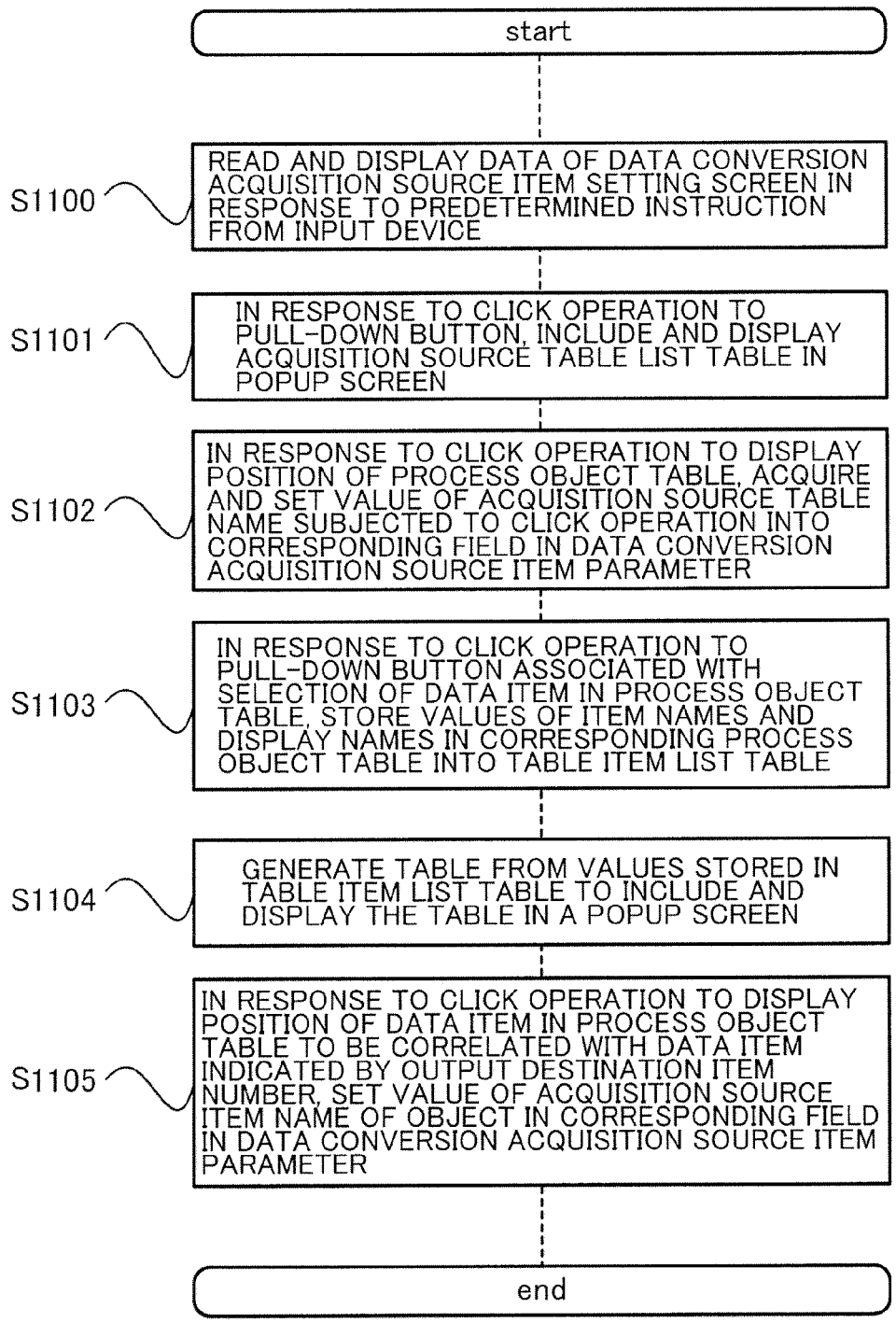
FIG. 8 is a flowchart of a first process procedure example of a data linkage support method in this embodiment.

FIG. 8 is a flowchart of a first process procedure example of the data linkage support method in this embodiment and is specifically a flowchart of a process by the function corresponding to the data conversion acquisition source item selection/storage program 110 included in the order-reception/placement production-management server 1.

In this case, the data conversion acquisition source item selection/storage program 110 of the order-reception/placement production-management server 1 reads the data of the data conversion acquisition source item setting screen 131 retained as the screen data 130 in the storage device 101 in response to a predetermined instruction from a person in charge of a consolidated subsidiary company in the input device 105, for example, and displays the data on the display device 106 (S1100).

Figure 10:
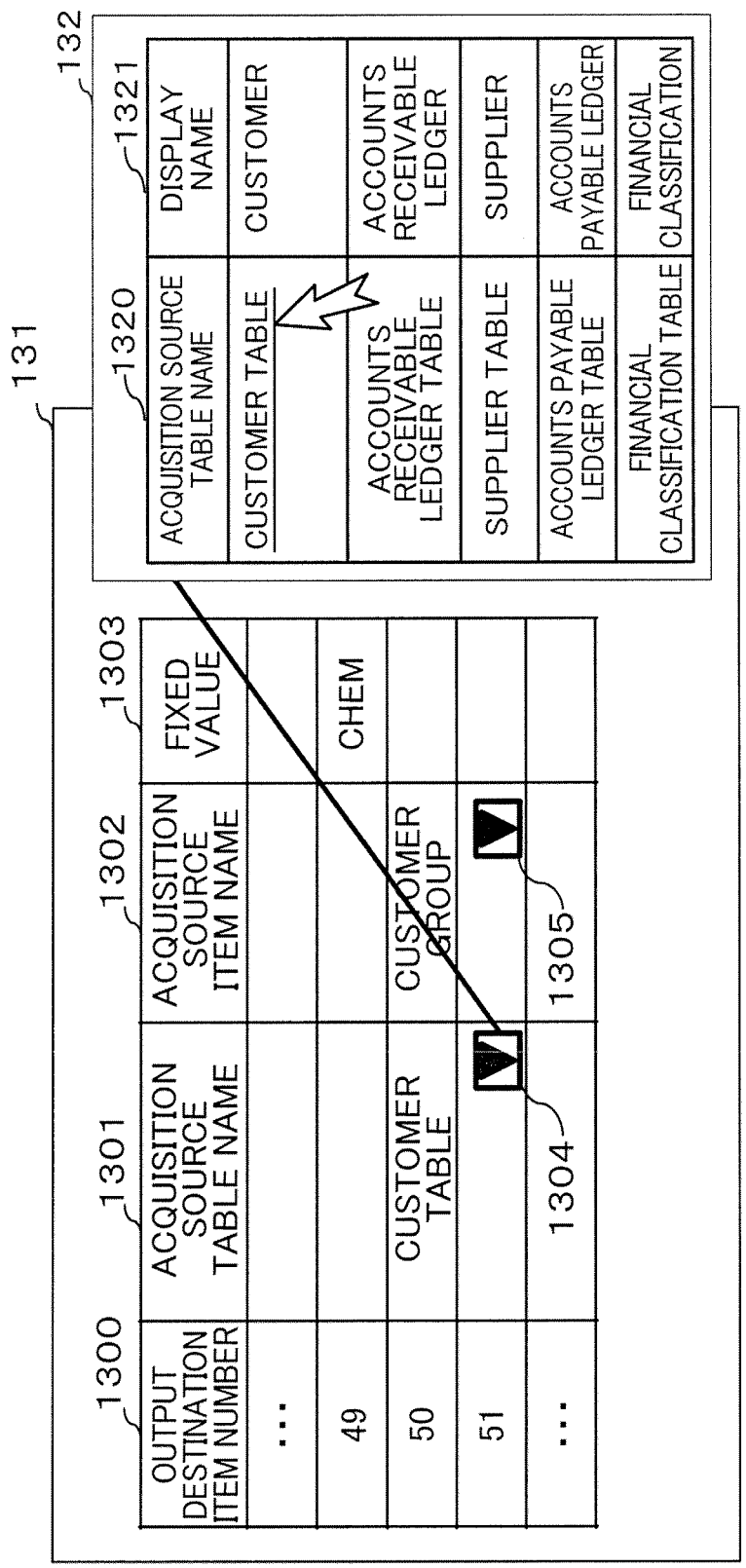
FIG. 10 is a diagram of a first display screen example in this embodiment.

FIG. 10 depicts a specific example of the screen displayed on the display device 106. The data conversion acquisition source item setting screen 131 includes a table made up of fields of an output destination item number 1300, an acquisition source table name 1301, an acquisition source item name 1302, and a fixed value 1303. The value of the output destination item number 1300 is a value set by the data conversion acquisition source item selection/storage program 110 reading the output destination item number 1210 of the output destination item number table 121 in accordance with or prior to the execution of step S1100.

On the other hand, the acquisition source table name 1301 and the acquisition source item name 1302 are already set only in a record having the output destination item number 1300 of "50" and are not set in a record having the output destination item number 1300 of "51", for example. It is assumed that "CHEM" is preliminarily set as a value of the fixed value 1303 in a record having the output destination item number 1300 of "49".

As described above, for a record without setting of the acquisition source table name 1301 and the acquisition source item name 1302 and without setting of the fixed value 1303, the data conversion acquisition source item selection/ storage program 110 displays a pull-down button 1304 as a table selection interface and a pull-down button 1305 as an item selection interface. It is obvious that the pull-down buttons 1304, 1305 may be displayed for a record having values of the acquisition source table name 1301 and the acquisition source item name 1302 already set, in response to a click operation through the input device 105, for example.

The person in charge of the consolidated subsidiary company browsing the data conversion acquisition source item setting screen 131 on the display device 106 performs a click operation with the input device 105 to the pull-down button 1304 in an attempt to select a process object table to be correlated with a data item in the accounting server 3, i.e., a data item indicated by the output destination item number 1300.

In response to the click operation described above, the data conversion acquisition source item selection/storage program 110 reads the acquisition source table list table 122 of the storage device 101 to include and display the table in a popup screen 132 on the display device 106 (S1101). As exemplarily illustrated in FIG. 10, the popup screen 132 includes a table having the values of the acquisition source table name 1220 and the display name 1221 included in the acquisition source table list table 122, as an acquisition source table name 1320 and a display name 1321, respectively.

The person in charge of the consolidated subsidiary company browsing the popup screen 132 on the display device 106 performs a click operation with the input device 105 to a display position of a table of the acquisition source table name 1320 corresponding to the process object table to be correlated with the data item in the accounting server 3, i.e., the data item indicated by the output destination item number 1300. In the example of FIG. 10, it is assumed that the click operation is performed to the display position of the "customer table".

In response to the click operation described above, the data conversion acquisition source item selection/storage program 110 acquires the value of the acquisition source table name 1320 subjected to the click operation, i.e., the "customer table", sets the value in the corresponding field of the acquisition source table name 1301 in the data conversion acquisition source item setting screen 131, and sets the value of "customer table" in the field of the acquisition source table name 1201 of the record having the corresponding output destination item number "51" in the data conversion acquisition source item parameter 120 (S1102).

As a result of the process to this point, as depicted in FIG. 11, the value of "customer table" is set in the field of the acquisition source table name 1301 out of the acquisition source table name 1301 and the acquisition source item name 1302, in which no value was set, in the record having the output destination item number "51" on the data conversion acquisition source item setting screen 131.

The person in charge described above browsing the data conversion acquisition source item setting screen 131 in this state then performs a click operation with the input device 105 to the pull-down button 1305 in an attempt to select any of the data items in the "customer table" to be correlated with the data item in the accounting server 3, i.e., the data item indicated by the output destination item number 1300.

In response to the click operation described above, the data conversion acquisition source item selection/storage program 110 reads the customer table 125 selected as the process object table out of the table DB 124 of the storage device 101, extracts values of the item names and the display names thereof in the customer table 125, and stores the values into the table item list table 123 (S1103). The data conversion acquisition source item selection/storage program 110 generates a table in which the values of the item names and the display names thereof in the customer table 125 stored in the table item list table 123 are set as an acquisition source item name 1310 and a display name 1311 so as to include and display the table in a popup screen 133 on the display device 106 (S1104).

Figure 12:
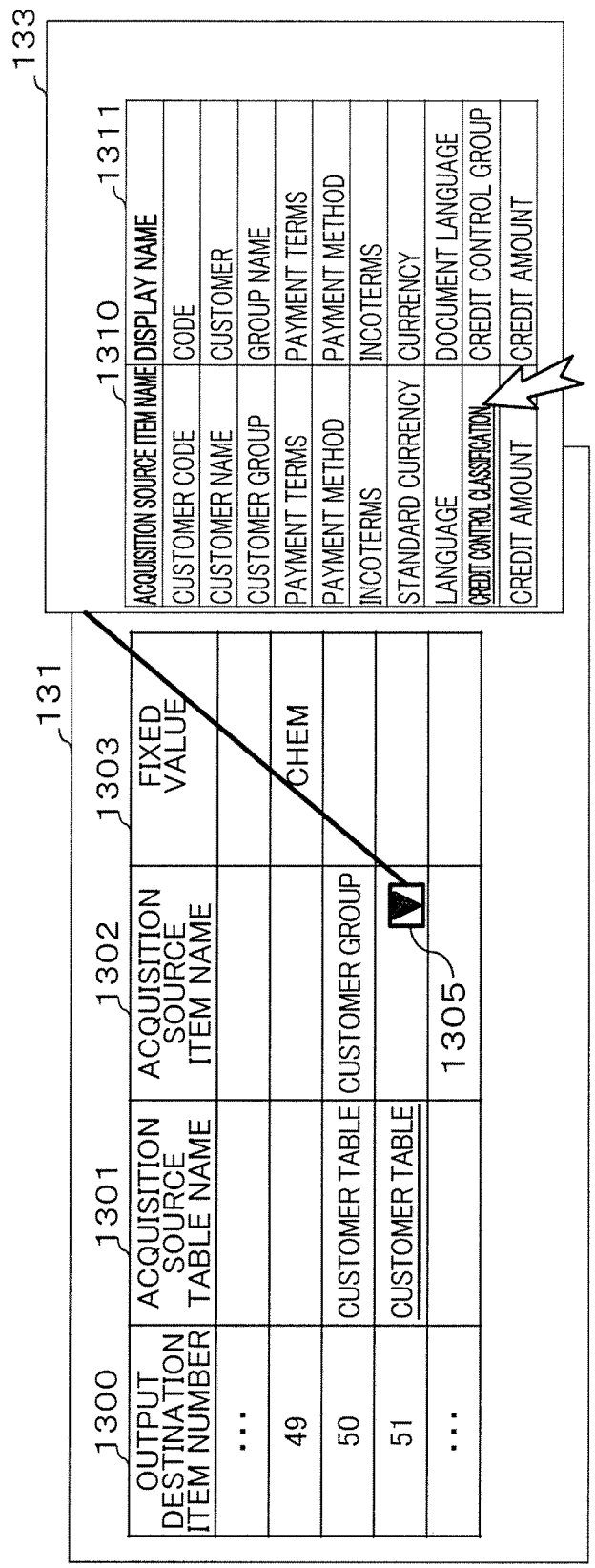
FIG. 12 is a diagram of a third display screen example in this embodiment.

In the case of the popup screen 133 exemplarily illustrated in FIG. 12, the consolidated subsidiary company is a company located in the United States and the customer table 125 is displayed as a table configured in accordance with the case of the data structure exemplarily illustrated in FIG. 6. On the other hand, in the case of the popup screen 133 exemplarily illustrated in FIG. 13, the consolidated subsidiary company is a company located in Germany and the customer table 125 is displayed as a table configured in accordance with the case of the data structure exemplarily illustrated in FIG. 7.

Figure 13:
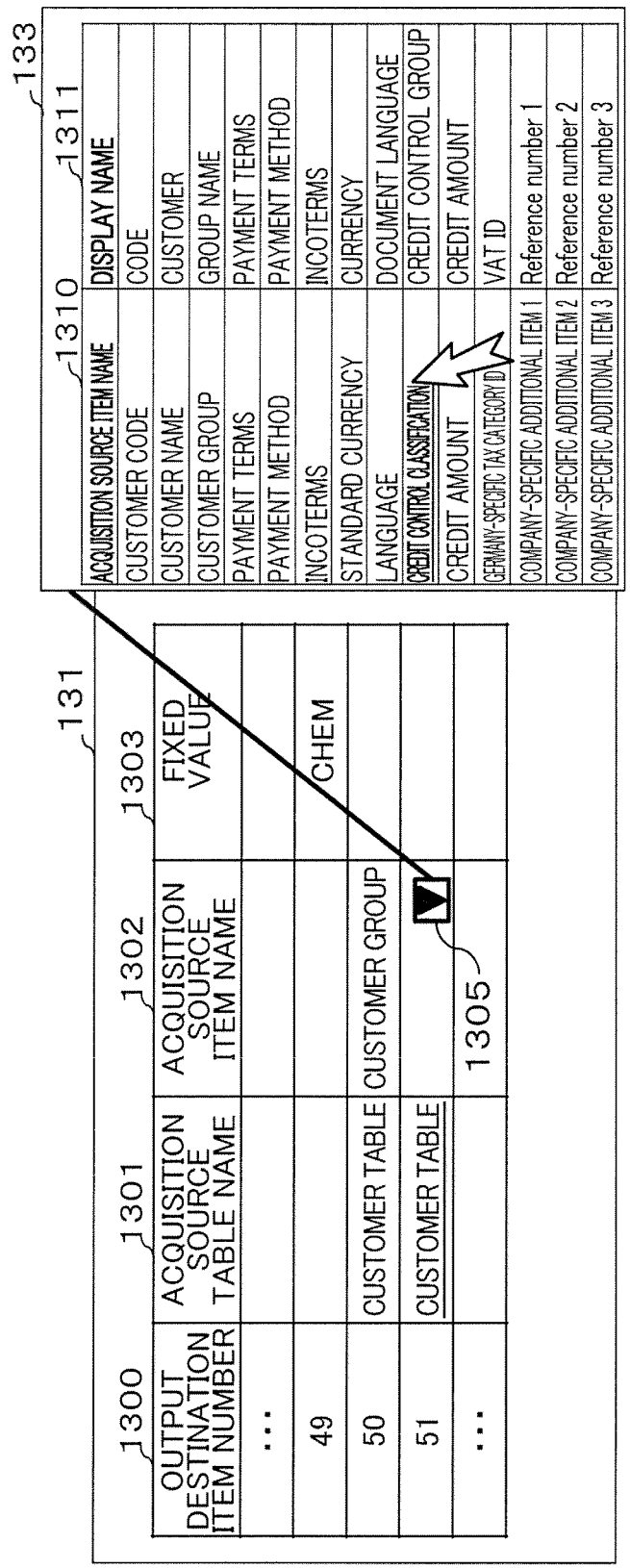
FIG. 13 is a diagram of a fourth display screen example in this embodiment.

The person in charge described above browsing the popup screen 133 on the display device 106 performs a click operation with the input device 105 to a display position of a data item of the acquisition source item name 1310 corresponding to the data item in the "customer table" to be correlated with the data item in the accounting server 3, i.e., the data item indicated by the output destination item number 1300. In the example of FIGS. 12 and 13, it is assumed that the click operation is performed to the display position of the "credit control classification".

In response to the click operation described above, the data conversion acquisition source item selection/storage program 110 acquires the value of the acquisition source item name 1310 subjected to the click operation, i.e., the "credit control classification", sets the value in the corresponding field of the acquisition source item name 1302 in the data conversion acquisition source item setting screen 131, and sets the value of "credit control classification" in the field of the acquisition source item name 1202 of the record having the corresponding output destination item number "51" in the data conversion acquisition source item parameter 120 (S1105).

As a result of the process to this point, as depicted in FIG. 14, the value of "customer table" is set in the field of the acquisition source table name 1301 and the value of "credit control classification" is set in the field of the acquisition source item name 1202 out of the acquisition source table name 1301 and the acquisition source item name 1302, in which no value was set, in the record having the output destination item number "51" on the data conversion acquisition source item setting screen 131. This state is also achieved in the data conversion acquisition source item parameter 120. Therefore, the correlation of the process object table of the order-reception/placement production-management server 1 and the data item thereof is completed in the order-reception/placement production-management server 1 for the output destination item number "51" in the accounting server 3.

Second Process Procedure Example

Figure 9:
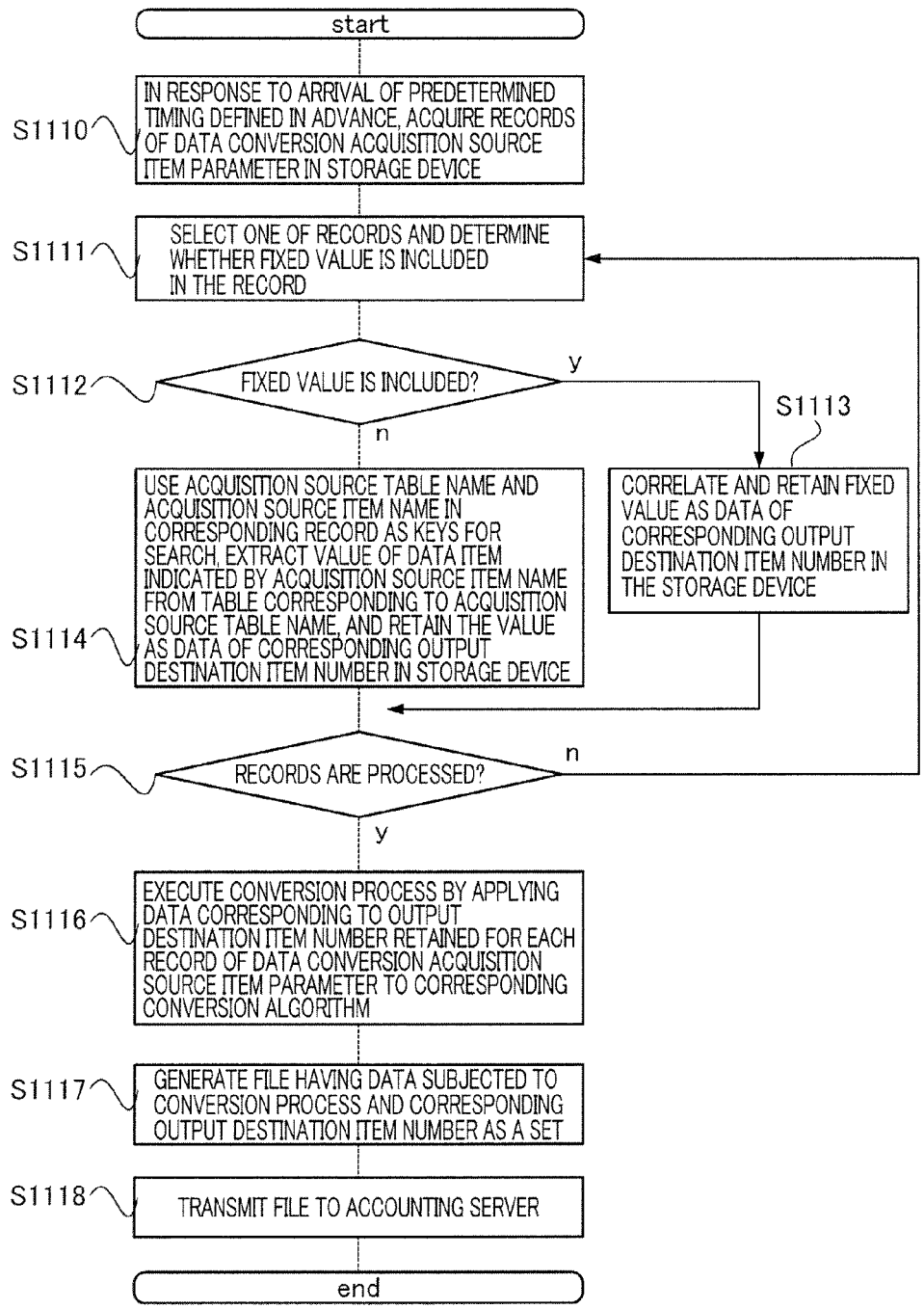
FIG. 9 is a flowchart of a second process procedure example of the data linkage support method in this embodiment.

Description will be made of a process of appropriately converting and providing the financial classification data in the order-reception/placement production-management server 1 to the accounting server 3 by using the data conversion acquisition source item parameter 120 with reference to the figures. FIG. 9 is a flowchart of a second process procedure example of the data linkage support method in this embodiment and is specifically a flowchart of a process of the data conversion program 111 included in the order-reception/placement production-management server 1.

In this case, the data conversion program 111 detects, for example, arrival of predetermined timing defined in advance, with a calendar function etc. typically included in a computer device and accordingly acquires the records of the data conversion acquisition source item parameter 120 in the storage device 101 (S1110). In the example of the data conversion acquisition source item parameter 120 of FIG. 2, the data conversion program 111 acquires "CHEM" of the fixed value 1203 for the record of the output destination item number "49", "customer table" of the acquisition source table name 1201 and "customer group" of the acquisition source item name 1202 for the record of the output destination item number "50", and also "customer table" of the acquisition source table name 1201 and "credit control classification" of the acquisition source item name 1202 for the record of the output destination item number "51".

The data conversion program 111 appropriately selects one of the records acquired at step S1110 in the order of the output destination item number, for example, and determines whether a fixed value is included in the corresponding record (S1111).

As a result of the determination, if the corresponding record includes a fixed value (S1112:y), the data conversion program 111 retains the fixed value in a correlated manner as the data of the corresponding output destination item number in the storage device 101 (S1113). In the example described above, the record of the output destination item number "49" includes "CHEM" as the fixed value 1203 and, therefore, the fixed value "CHEM" is retained as the data of the output destination item number "49" in the storage device 101.

On the other hand, if the corresponding record does not include a fixed value (S1112:n), the data conversion program 111 uses the acquisition source table name 1201 and the acquisition source item name 1202 in the corresponding record as keys to search the table DB 124 in the storage device 101, extracts a value of the data item indicated by the acquisition source item name 1202 from the table corresponding to the acquisition source table name 1201, and retains this value in a correlated manner as the data of the corresponding output destination item number in the storage device 101 (S1114).

In the example described above, the records of the output destination item numbers "50" and "51" include no fixed value and, therefore, for example, for the record of the output destination item number "50", the data conversion program 111 uses "customer table" of the acquisition source table name 1201 and "customer group" of the acquisition source item name 1202 as keys to search the table DB 124, thereby acquiring the values of "A", "A", "B" as the values of the "customer group" in the "customer table" of FIG. 6, for example. For the record of the output destination item number "51", the data conversion program 111 uses "customer table" of the acquisition source table name 1201 and "credit control classification" of the acquisition source item name 1202 as keys to search the table DB 124, thereby acquiring the values of "A", "A", as the values of the "credit control classification" in the "customer table" of FIG. 6, for example.

If the execution of the processes of steps S1111 to S1114 described above are completed for the records acquired at step S1110 (S1115:y), the data conversion program 111 executes a conversion process by applying the data corresponding to the output destination item number retained in the storage device 101 for the records of the data conversion acquisition source item parameter 120 to a predetermined conversion algorithm retained in advance for the data item corresponding to the output destination item number (S1116).

For example, if the value of data retained at step S1113 for a certain output destination number is "10.111" and a prescript such as "two decimal places" exists in the decimal point 1214 of the output destination item number table 121 for the data item corresponding to the output number item number, the data conversion program 111 retains a conversion algorithm such as "truncating the numbers after two decimal places" and applies this conversion algorithm to "10.111" to execute the conversion process of the corresponding data to "10.11".

The data conversion program 111 generates a file having the data subjected to the conversion process at step S1115 and the corresponding output destination item number as a set (S1117) and transmits this file to the accounting server 3 (S1118). On the other hand, the accounting server 3 can receive and use this file as the financial classification data of the consolidated subsidiary company operating the order-reception/placement production-management server 1 to execute the usual accounting process.

The data conversion program 111 may transmit the data corresponding to the output destination item number retained in the storage device 101 for the records of the data conversion acquisition source item parameter 120 in correlation with the corresponding output destination item number to the accounting server 3 without executing the conversion process of step S1116. This process is applied only when the value of data retained at step S1114 for a certain output destination item number has structure matching the specifications prescribed in the output destination item number table 121 for the data item corresponding to the output destination item number.

Although the best mode for carrying out the present invention has been specifically described, the present invention is not limited thereto and can variously be modified without departing from the spirit thereof. For example, although the customer table is exemplified as a linkage object table in the embodiment, the same effect is acquired in the case of using various tables such as a financial classification table, an accounts receivable ledger table, an accounts payable ledger table, and a supplier table as a linkage object. Although the screen is displayed on the order-reception/placement production-management server in the form of the embodiment, the same effect is acquired in the form of displaying the screen on a user terminal accessing the corresponding server.

According to this embodiment, specifications for linkage can be changed with respect to a system for data linkage in each subsidiary company without additional work such as a program modification by a developer, leading to an efficient reduction in costs and efforts of development and operation of the system.

Therefore, this enables linkage of accounting data variously different in specification between companies to be consolidated under favorable cost performance and efficiency.

At least the following facts become apparent from this description. In particular, in the data linkage support system of this embodiment, the arithmetic device may further execute a process of transmitting data of a data item in the process object table to the accounting system in correlation with a data item of the specification information prescribed by the conversion parameter with respect to the corresponding data item.

As a result, the data retained in terms of order reception/placement and production management of products in the consolidated subsidiary company, i.e., the data of the process object table described above, can be provided to the accounting system after efficiently achieving clear correlation with the accounting data of the parent company without imposing a particular burden on a person in charge of the consolidated subsidiary company or a system developer etc. The accounting system can execute the accounting process for the corresponding item based on the data acquired in this way.

In the data linkage support system of this embodiment, when displaying the screen including the item selection interface, the arithmetic device may display on a display device or a predetermined terminal the screen further including a table selection interface accepting selection of the process object table to be correlated with the data item, generate a list of data items included in the process object table with respect to the process object table of the selection accepted through the screen, and display on the display device or the predetermined terminal the screen including the list as a selection list of the data items in the item selection interface and, when generating the conversion parameter, the arithmetic device may correlate the corresponding data item selected in the list of the item selection interface with a data item prescribed by the specification information to generate and store the conversion parameter into the storage device.

As a result, in the case of managing a plurality of process object tables in a consolidated subsidiary company, the conversion parameter can be generated by first identifying data to be correlated with a predetermined item of the accounting data of the parent company on the basis of a table and then accepting the selection of the data item with respect to the identified table. Such a process is executed without imposing a particular burden on a person in charge of the consolidated subsidiary company or a system developer etc.

In the data linkage support system of this embodiment, the arithmetic device may convert data of a data item in the process object table in accordance with a predetermined conversion algorithm corresponding to the specification information prescribed by the conversion parameter with respect to the corresponding data item, and transmit the converted data in correlation with a data item prescribed by the specification information to the accounting system.

As a result, the data retained in terms of order reception/placement and production management of products in the consolidated subsidiary company, i.e., the data of the process object table described above, can be converted into a form corresponding to the specification of the corresponding item in the accounting data of the parent company and the converted data can be provided to the accounting system. Such a process is executed without imposing a particular burden on a person in charge of the consolidated subsidiary company. This enables the accounting system to more efficiently execute the accounting process related to the corresponding item based on the data acquired in this way.

In the data linkage support method of this embodiment, the computer system may further execute a process of transmitting data of a data item in the process object table to the accounting system in correlation with a data item of the specification information prescribed by the conversion parameter with respect to the corresponding data item.

In the data linkage support method of this embodiment, when displaying the screen including the item selection interface, the computer system may display on a display device or a predetermined terminal the screen further including a table selection interface accepting selection of the process object table to be correlated with the data item, generate a list of data items included in the process object table with respect to the process object table of the selection accepted through the screen, and display on the display device or the predetermined terminal the screen including the list as a selection list of the data items in the item selection interface and, when generating the conversion parameter, the computer system may correlate the corresponding data item selected in the list of the item selection interface with a data item prescribed by the specification information to generate and store the conversion parameter into the storage device.

In the data linkage support method of this embodiment, the computer system may convert data of a data item in the process object table in accordance with a predetermined conversion algorithm corresponding to the specification information prescribed by the conversion parameter with respect to the corresponding data item, and transmit the converted data in correlation with a data item prescribed by the specification information to the accounting system.

What is claimed is:

1. A formatted financial classification data distribution system comprising:
   a production management server; and
   an accounting server communicatively coupled to the production management server;
   wherein the production management server includes:
   a volatile memory,
   one or more input devices,
   a non-volatile memory,
   one or more processors, and
   a display;
   wherein the production management server:
   detects an occurrence of a predetermined timing event,
   retrieves, from the non-volatile memory, records for one or more consolidated subsidiary companies based on the occurrence of the predetermined timing event, wherein the records include an output destination item number and an output destination,
   filters the records to select one of the records based on the output destination item number to determine one or more conversion methods,
   generates an output file for the records based on the one or more conversion methods, wherein the output file includes financial classification data,
   formats the financial classification data of the output file according to the one or more conversion methods, and
   transmits the output file to the accounting server based on the output destination;
   wherein the accounting server:
   in response to receiving the output file, automatically extracts the financial classification data and enables consolidated accounting on the one or more consolidated subsidiary companies.

2. The system of claim 1, wherein
the display of the production management server displays the financial classification data.

3. The system of claim 1, wherein
the display of the production management server displays a table selection interface accepting selection of one or more selected consolidated subsidiary companies.

4. The system of claim 1, wherein
the production management server further:
stores the financial classification data of the output file in the memory.

5. A method of distributing formatted financial classification data over a network to an accounting server, the method comprising:
detecting, by a production management server, an occurrence of a predetermined timing event, wherein the production management server includes:
a volatile memory,
one or more input devices,
a non-volatile memory,
one or more processors, and
a display;
retrieving, by the production management server, records for one or more consolidated subsidiary companies from the non-volatile memory based on the occurrence of a predetermined timing event, wherein the records include an output destination item number and an output destination;
filtering, by the production management server, the records to select one of the records based on the output destination item number to determine one or more conversion methods;
generating, by the production management server, an output file for the records based on the one or more conversion methods, wherein the output file includes financial classification data;
formatting, by the production management server, the financial classification data of the output file according to the one or more conversion methods, and
transmits, by the production management server, the output file to the accounting server based on the output destination;
receiving, by the accounting server, the output file;
automatically extracting, by the accounting server, the financial classification data; and
performing, by the accounting server, consolidated accounting on the one or more consolidated subsidiary companies.

6. The method of claim 5, further comprising:
displaying, by the production management server, the financial classification data on the display.

7. The method of claim 5, further comprising:
displaying, by the production management server, a table selection interface accepting selection of one or more selected consolidated subsidiary companies.

8. The method of claim 5, further comprising:
storing, by the production management server, the financial classification data of the output file in the memory.

* * * * *